United States Patent [19]

Banholzer

[11] 4,289,169
[45] Sep. 15, 1981

[54] HEAT-EXPANDABLE MULTI-PASSAGE PIPE HAVING PARTS FOR INTENDED BREAKAGE

[75] Inventor: Detlef Banholzer, Wolfsburg, Fed. Rep. of Germany

[73] Assignee: Volkswagenwerk AG, Wolfsburg, Fed. Rep. of Germany

[21] Appl. No.: 95,934

[22] Filed: Nov. 20, 1979

[30] Foreign Application Priority Data

Apr. 20, 1979 [DE] Fed. Rep. of Germany ....... 2916030

[51] Int. Cl.$^3$ .................. D03D 13/00; F01N 7/00; F28F 7/00; B65D 65/28
[52] U.S. Cl. .................... 138/117; 60/322; 60/323; 138/37; 165/81; 220/89 A; 285/4; 285/187; 428/43; 428/167
[58] Field of Search .................. 138/37, 38, 39, 111, 138/115, 116, 117; 60/322, 323; 285/2, 3, 4, 187; 165/81; 428/43, 64, 65, 131, 167; 220/89 A

[56] References Cited

U.S. PATENT DOCUMENTS

| 3,798,903 | 3/1974 | Mitchell et al. | 285/187 |
| 3,864,909 | 2/1975 | Kern | 60/323 |
| 4,097,071 | 6/1978 | Crawford et al. | 285/187 |
| 4,188,784 | 2/1980 | Hall | 60/323 |

FOREIGN PATENT DOCUMENTS 2710357 9/1978 Fed. Rep. of Germany.

*Primary Examiner*—Steven L. Stephan
*Attorney, Agent, or Firm*—Spencer & Kaye

[57] ABSTRACT

A heat-expandable tube-like component includes a tubular wall having a length dimension and defining an inner space; and a septum attached to the tubular wall and dividing the inner space into separate, longitudinally extending passages. The septum has a weakened portion which includes first and second groove-like recesses in opposite faces of the septum. The first recess extends substantially parallel to the length dimension (axial dimension) of the tubular wall. The second groove-like recess extends slightly offset from and parallel to the first groove-like recess. Further, portions of the septum flanked by the first and second recesses are sufficiently weak to break under the effect of forces derived from heat-caused expansion of the component. Also, the recesses are so arranged with respect to one another that upon breakage of the septum portions flanked by the recesses the septum halves obtained by the breakage are adapted to glide past one another.

3 Claims, 5 Drawing Figures

HEAT-EXPANDABLE MULTI-PASSAGE PIPE HAVING PARTS FOR INTENDED BREAKAGE

BACKGROUND OF THE INVENTION

This invention relates to a tubular structural component which is thermally stressed in service and which, by means of a septum, is separated into several flow passages or the like. Such a component may find application particularly in the outlet zone of an exhaust manifold which forms part of the exhaust system of an internal combustion engine.

In order to improve the engine performance of internal combustion engines, it is conventional to use multi-passage pipes (that is, pipes which have exhaust channels separated from one another) in the exhaust system, at least in the zone adjacent the exhaust manifold. The outlet portion of the exhaust manifold itself is, in such cases, designed as a multi-channel component; the septum in the exhaust manifold and the septum in the adjoining exhaust pipe are in alignment with one another. Frequently, the connection between the exhaust manifold and the exhaust pipe is designed as an articulated joint, wherein the exhaust manifold is provided with a cylindrical sealing flange to which the exhaust pipe is secured by means of a bowl-shaped terminus with the interposition of a heat-resistant sealing ring. By virtue of this coupling structure oscillations and vibrations occurring during operation may be taken up.

During the operation of the internal combustion engine the exhaust manifold and the exhaust pipe are exposed to hot exhaust gases whose temperature may reach approximately 900° C. The septum of the exhaust manifold which is exposed to the hot exhaust gases on both sides is heated to a substantially greater extent than the outer wall of the exhaust manifold which, in addition, is better cooled, particularly by air streams generated during vehicle travel. Thus, the septum which expands to a greater extent due to heating, risks to deform the originally circular sealing flange of the exhaust manifold, that is, it may exert such a pressure on the flange that the latter assumes a cross-sectionally oval configuration. As a result of this occurrence a satisfactory sealing effect between the sealing flange and the sealing ring can no longer be ensured.

SUMMARY OF THE INVENTION

It is an object of the invention to provide an improved tubular structural component of the aboveoutlined type in which deformations or uncontrolled breakages caused by thermal stresses are prevented while its basic functions are retained.

This object and others to become apparent as the specification progresses, are accomplished by the invention, according to which, briefly stated, the septum of the tubular component includes at least one intended location of breakage (weakened portion) which extends in the length dimension of the component and which becomes effective during thermal stresses that normally occur during operation. The intended location of breakage is formed of a longitudinally extending first groove-like recess arranged on the one side of the septum and a second groove-like recess extending on the other side of the septum parallel to and at a small distance from the first recess. The depth, shape and position of the recesses are so selected that after breakage of the septum portion flanked by the two recesses, the two wall halves may slide past one another in an overlapping relationship.

By providing for an intended location of breakage in the septum it is ensured that an appreciable deformation of the tubular component which would adversely affect the operation thereof is prevented because the septum, prior to exerting the critical deforming forces on the component, is interrupted in continuity at the intended location of breakage, so that the wall halves situated at either side of the location of breakage may, upon further thermal expansion, move past one another into the inside of the structural component. The separating effect of the septum is thus not appreciably affected, if at all, because the two wall halves lie sealingly on one another. A disadvantageous effect on the engine performance thus does not occur.

The above-outlined problem of deformation and uncontrollable breakage could have been theoretically resolved to initially include in the septum an obliquely extending slot as an expansion groove which could be expected to prevent a deformation of the tubular structural component. Such a solution, however, would be disadvantageous in that a slot, from the point of view of casting technology cannot be provided in the original cast; it could only be subsequently provided by means of mechanical machining such as sawing or grinding. Further, such a relatively wide separating slot would cause an undesirable circulatory short circuit between the flow passages that are separated by the septum. Further, the wall portions extending with sharp edges in the zone of such a separating slot would be exposed to heat-caused corrosion which would result in wear. All these disadvantages do not appear in the tubular component structured according to the invention.

DESCRIPTION OF THE PREFERRED EMBODIMENT

Turning now to the Figures, there will be described a preferred embodiment of the invention, with several variants, finding an advantageous application in the exhaust system of an internal combustion engine.

Figure 1:
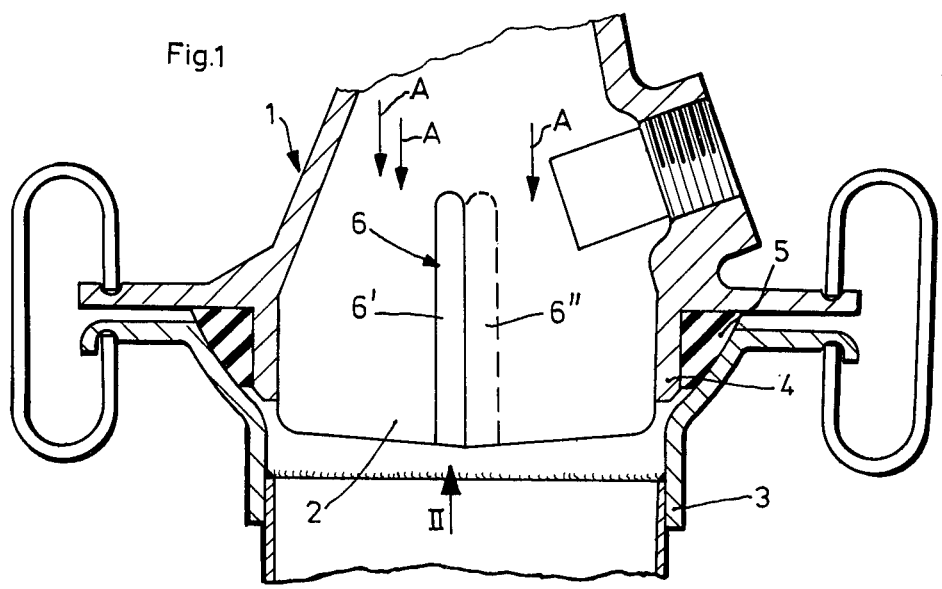
FIG. 1 is an axial sectional view of the zone of an articulation between an exhaust manifold and an exhaust pipe connected thereto and incorporating a preferred embodiment of the invention.
Figure 2:
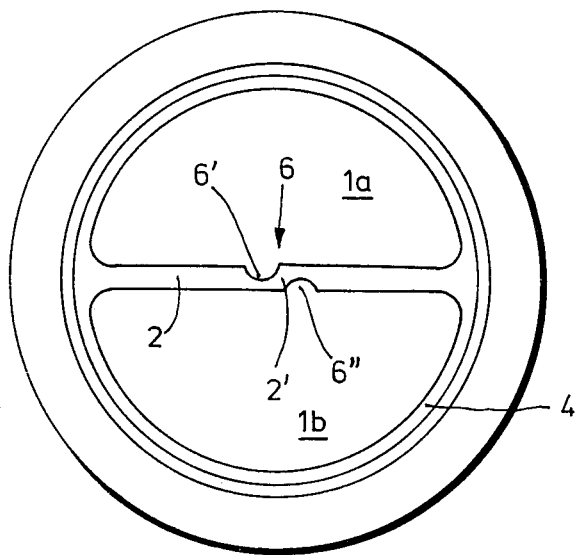
FIG. 2 is an end view of the structure shown in FIG. 1 as viewed in the direction of the arrow II.

Turning now particularly to FIGS. 1 and 2, during the operation of the internal combustion engine (not shown) a cast exhaust manifold 1 carries hot exhaust gases in the direction of the arrows A. From the exhaust manifold 1, the gases enter an exhaust pipe 3 connected with the exhaust manifold 1.

Turning now in particular to FIG. 2, an outlet portion of the exhaust manifold 1 is divided by a septum 2 into two separated flow passages 1a and 1b. A similar—not illustrated—division of the flow passage cross section is also provided in the exhaust pipe 3; the septum of the exhaust manifold, on the one hand and that of the exhaust pipe, on the other hand are in alignment with one another. Such a division of the exhaust gases along at least one part of their traveling path is advantageous for reasons of engine performance.

That end of the exhaust manifold 1 which is oriented towards the exhaust pipe 3 is formed as a cylindrical sealing flange 4. The septum 2 is cast together with the exhaust manifold 1 and thus constitutes an integral component of the exhaust manifold. The exhaust pipe 3 is secured to the exhaust manifold 1 with the interposition of a heat-resistant intermediate sealing ring 5. Further details of this joint connection are not shown. The outer contour of the sealing ring 5 as well as the contour of the pipe portion engaging the sealing ring 5 are so designed that a ball joint-like connection is obtained whereby oscillations, vibrations as well as mounting tolerances may be compensated for or may be taken up.

The hot exhaust gases, as they pass through the channels of the exhaust manifold, substantially heat particularly the septum 2 which is exposed to the exhaust gases on both sides. In contradistinction, the outer tubular wall including the cylindrical sealing flange 4 is heated to a somewhat lesser extent, since the conditions for cooling are more favorable there. Due to these thermal conditions, the septum 2 undergoes, from one pipe wall to the other, a greater heat-caused expansion than the heat-caused increase of the diameter of the sealing flange 4. Without particular measures, such an occurrence would cause the circular cross section of sealing flange 4 to be necessarily deformed to assume, for example, an oval shape. This, however, would result in a marked deterioration of the seal between the exhaust pipe 3 and the sealing flange 4. Further, non-controllable breakages may also occur.

In order to prevent the above-outlined disadvantageous results, in the mid zone of the septum 2 there is provided an intended location of breakage 6. This location is formed of a first groove-like recess 6' which extends on the one face of the septum 2 in the longitudinal dimension of the tubular component and a second groove-like recess 6" which, in turn extends on the other face of the septum 2, parallel to and at a small distance from the recess 6'. The depth, the configuration, as well as the position of the two recesses 6', 6" are so selected that between the two recesses there remains only a thin residual connecting portion 2' of the septum 2.

Upon reaching a predetermined thermal stress, the septum portion 2' breaks under the effect of sheering stresses. In the course of continued heat-caused expansion of the septum 2, the two wall halves to the right and to the left of the location of breakage may move past one another towards the middle of the pipe so that no deforming forces will be exerted on the sealing flange 4. The separating groove obtained during these occurrences is of such a small dimension that a flow dynamic communication between the two passages 1a and 1b on the two sides of the septum 2 practically does not occur.

Figure 3A:
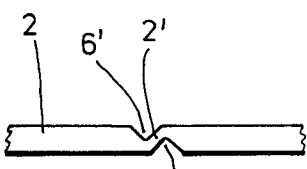
FIGS. 3a, 3b and 3c are three variants of a detail shown in FIG. 2.
Figure 3B:
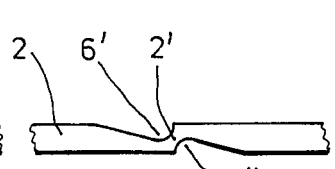
Figure 3C:
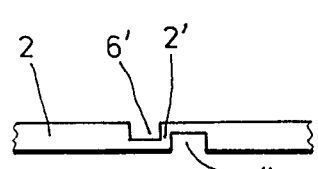

The groove-like recesses 6' and 6" extending in the longitudinal direction of the structural component, that is the exhaust manifold 1, may advantageously be cast together with the septum 2, so that no subsequent mechanical machining (boring, sawing, milling etc.) is necessary. The shape of the groove-like recesses may, in principle, be arbitrarily selected. Thus, the recesses may have an angular, pointed, oval or round cross-sectional shape. Examples of such groove shapes are shown schematically in FIGS. 3a, 3b and 3c. From the point of view of casting technology, it is, however, of advantage to utilize rounded contours as shown, for example, in FIG. 2 or in FIGS. 3a and 3b. In order to ensure that the groove-like recesses perform their function fully and reliably, they have to be of such a length that the critical zone (concerning the deformation of the structural component) is well overlapped. Thus in the case of the described embodiment, the intended location of breakage 6 should be sufficiently longer than the axial length of the sealing flange 4, as it may be observed in FIG. 1.

It will be understood that the above description of the present invention is susceptible to various modifications, changes and adaptations, and the same are intended to be comprehended within the meaning and range of equivalents of the appended claims.

What is claimed is:

1. In a heat-expandable tube-like component including a tubular wall having a length dimension and defining an inner space; and a septum attached to the tubular wall and dividing the inner space into separate, longitudinally extending passages; the improvement wherein said septum has a weakened portion comprising means defining a first groove-like recess in one face of said septum; said first groove-like recess extending substantially parallel to said length dimension; and means defining a second groove-like recess in another, opposite face of said septum; said second groove-like recess extending slightly offset from and parallel to said first groove-like recess; further wherein portions of said septum flanked by said first and second groove-like recesses are sufficiently weak to break under the effect of forces derived from heat-caused expansion of said component; and further wherein said recesses being so arranged with respect to one another that upon breakage of the septum portions flanked by said recesses the septum halves obtained by the breakage are adapted to glide past one another.

2. A component as defined in claim 1, wherein said tubular wall, said septum and said means defining said recesses in said septum constitute a single cast unit.

3. In an assembly including a heat-expandable first tube-like component comprising a tubular wall having a length dimension and defining an inner space; a septum attached to the tubular wall and dividing the inner space into separate, longitudinally extending passages; and a second tube-like component attached to the first tube-like component as a continuation thereof; the improvement wherein said septum has a weakened portion comprising means defining a first groove-like recess in one face of said septum; said first groove-like recess extending substantially parallel to said length dimension; means defining a second groove-like recess in another, opposite face of said septum; said second groove-like recess extending slightly offset from and parallel to said first groove-like recess; further wherein portions of said septum flanked by said first and second groove-like recesses are sufficiently weak to break under the effect of forces derived from heat-caused expansion of said first tube-like component; further wherein said recesses being so arranged with respect to one another that upon breakage of the septum portions flanked by said recesses the septum halves obtained by the breakage are adapted to glide past one another; further wherein said septum is arranged in at least one terminal length portion of said first tube-like component; said terminal length portion forming a cylindrical sealing flange; and a heat-resistant sealing ring; said second tube-like component being attached to said sealing flange with the interposition of said sealing ring.

* * * * *